M. ROTHFUSS.
MACHINE FOR INSERTING LAG SCREWS.
APPLICATION FILED AUG. 21, 1913.

1,149,222. Patented Aug. 10, 1915.

UNITED STATES PATENT OFFICE.

MICHAEL ROTHFUSS, OF WILLIAMSPORT, PENNSYLVANIA.

MACHINE FOR INSERTING LAG-SCREWS.

1,149,222.

Specification of Letters Patent.

Patented Aug. 10, 1915.

Application filed August 21, 1913. Serial No. 785,896.

*To all whom it may concern:*

Be it known that I, MICHAEL ROTHFUSS, a citizen of the United States, residing in the city of Williamsport, in the county of Lycoming and State of Pennsylvania, have invented a new and useful Machine for Inserting Lag-Screws Used in Assembling Certain Articles of Furniture.

The lag screws referred to are bolts having at one end a wood screw thread, and at the other end an ordinary screw thread to carry a nut, the same being employed to join different portions of an article of furniture together.

My invention relates to improvements in machines to insert these screws where required, and is designed to automatically grip the screw, revolve it until it is driven to the proper depth, and then automatically stop the revolution and release the screw; whereby I obtain greater rapidity of operation and also more perfect uniformity and exactness in the depth to which the screw is driven, than can be attained by any other device now in use.

The accompanying drawings illustrate my machine, in which—

Figure 1 is a perspective side view of the machine, attached to the wall or post $w$. Fig. 2 is a detail view of the upright A shaped piece $f$ and its arm $m$.

The frame of the machine consists of a bracket $x$, or any suitable table, carrying a shaft $s$ in two bearings $t$ $t$, having a driving pulley $d$, and the front end fitted with a chuck $z$ for gripping the lag screw. In one or both of the bearings $t$ $t$ are suitable devices, not shown, to prevent longitudinal motion of the shaft.

The driving pulley $d$ has a limited lateral motion on the shaft and normally runs loose. To the inner arms of the chuck is attached a friction sleeve $k$ to engage a corresponding friction surface or cone on the outer hub of the pulley $d$, so as to cause the shaft to revolve when the two friction surfaces are brought into contact. Upon the shaft adjoining the inner hub of the pulley $d$, is a loose collar $q$. This collar, which does not turn with the shaft, has a finger $y$ which extends laterally somewhat over the inner hub of the pulley, and turns downward into an annular groove $g^2$ in the pulley hub. To the under side of the collar $q$ is rigidly attached an arm $i$ which extends back underneath the frame of the machine. In this arm $i$ is an opening $l^2$ into which the end of the upright arm of the lever $l$ is inserted. The lever $l$ is pivoted at its elbow on a piece projecting downward from the frame of the machine. A treadle $h$ carries an upright rod $g$ which is hinged at its lower end on the treadle, and the upper end of which rod contains a notch $n$ which engages a pin on the horizontal arm of the lever $l$. An upright A shaped piece $f$, which is hinged at both feet to the floor, so as to allow a forward and backward motion of its upper end, extends upward beneath the machine and carries an arm which extends underneath and forward to the front of the chuck, where it forms a stop $e$ for the piece of furniture operated upon. The said arm $m$ is pierced with a hole $s'$ through which passes the rod $g$ connected with the treadle, so that when the arm $m$ is moved backward or forward it carries with it the upper end of the rod $g$.

A spiral spring $p$ extends from the arm $i$ to the back part of the frame, the function of which when released, is to draw back the arm $i$ and with it the collar $q$ and pulley $d$ and thereby release the friction gear of the pulley.

A spiral spring $n$ in the chuck, when released, opens the jaws of the chuck, and a spiral spring $o$ extending from a suitable point in the rod $g$ to the arm $m$ serves to raise the treadle when the foot of the operator is removed.

It is apparent that the pulley being in motion and running loose, and a lag screw being inserted in the jaws of the chuck, if now the treadle is depressed by the operator, it will follow that by means of the rod $g$ and pivoted lever $l$, the arm $i$ together with the collar $q$ and pulley $d$ will be thrust forward until the friction cone of the pulley comes into contact with the friction surface attached to the chuck and shaft, causing the shaft to rotate, and at the same time the inner arms of the chuck will be expanded causing the jaws $a$ to grip the lag screw and revolve it until it is inserted to the depth required. As the lag screw is being inserted, the piece of furniture being operated on is moved forward until it strikes the stop $e$, which forces backward the arm $m$ and pushes the notch in the rod $g$ off the pin in the lever $l$, whereupon the spring $p$ instantly, through the means indicated, withdraws the pulley $d$ from the friction driving surface, so that the shaft stops rotating and the spiral spring $n$ opens the jaws of the chuck and releases the lag screw. The operator then raises his foot from the treadle and the spring $o$ raises the treadle and with it the rod $g$ into position to again engage the pin on the lever $l$, and the weight of the arm $m$ assisted by the spring $o$ brings the stop $e$ back to its former position ready for another operation.

What I claim as my invention, and desire to secure by Letters Patent is:—

1. In a machine for inserting lag screws the combination with a rotatable shaft and a gripping chuck thereon, a member slidable on the shaft and operatively connected to said chuck, means co-acting with the member normally to hold the chuck in inoperative position, and means adapted to engage said member to cause the chuck to engage and hold a screw.

2. The combination with a rotatable shaft and a chuck having pivoted arms with gripping jaws, a sleeve slidable on the shaft and a spring between the sleeve and chuck, pivoted links connecting the arms and sleeve, a shiftable driving pulley on the shaft adapted to operatively engage said sleeve to close the gripping jaws, and means adapted to shift said pulley.

3. The combination with a rotating shaft and its supporting frame and a gripping chuck on the shaft, of a shiftable pulley on the shaft having an annularly grooved hub adapted to co-act with means for actuating the chuck, an arm slidable on the frame having a collar on the shaft, a finger on the collar engaging the grooved hub, and a treadle mechanism for actuating said slidable arm.

4. The combination with a rotatable shaft and a chuck thereon, having pivoted arms with gripping jaws, of a slidable sleeve on the shaft with links pivoted to said arms and a spring between said chuck and sleeve, a shiftable pulley and means for operatively connecting the pulley with the sleeve, a grooved hub to the pulley, a slidable arm having a collar embracing the shaft and a finger on the collar engaging the grooved hub, and treadle mechanism for actuating the slidable arm.

5. In a machine for inserting lag screws, the combination with a rotatable shaft and a gripping chuck thereon, of a member slidable on the shaft and operatively connected to said chuck, means co-acting with the member normally to hold the chuck in inoperative position, means adapted to engage said member to cause the chuck to engage and hold a screw, and a movable stop device in front of the chuck, operable when pressed back by a piece of furniture, to automatically release the gripping chuck.

In testimony whereof I have signed my name to this specification in the presence of two subscribing witnesses.

MICHAEL ROTHFUSS.

Witnesses:
E. E. SWINEHART,
OLIVER J. DECKER.